United States Patent [19]

Wessling et al.

[11] 4,161,502

[45] Jul. 17, 1979

[54] PROCESS FOR FORMING PLASTIC ARTICLES

[75] Inventors: Ritchie A. Wessling; Edward F. Gurnee, both of Midland, Mich.

[73] Assignee: The Dow Chemical Company, Midland, Mich.

[21] Appl. No.: 789,385

[22] Filed: Apr. 2, 1977

Related U.S. Application Data

[63] Continuation-in-part of Ser. No. 704,261, Jul. 12, 1976, abandoned, which is a continuation of Ser. No. 545,662, Jan. 30, 1975, abandoned, which is a continuation-in-part of Ser. No. 347,172, Apr. 2, 1973, abandoned.

[51] Int. Cl.² .............................................. B29C 3/00
[52] U.S. Cl. .................................... 264/119; 264/120; 264/126
[58] Field of Search .............. 264/109, 119, 126, 120

[56] References Cited

U.S. PATENT DOCUMENTS

| | | | |
|---|---|---|---|
| 2,717,419 | 9/1955 | Dickey | 264/119 |
| 3,336,244 | 8/1967 | Rockoff | 264/126 |
| 3,414,643 | 12/1968 | Collie | 264/109 |
| 3,662,052 | 5/1972 | Nowak et al. | 264/119 |

*Primary Examiner*—Robert F. White
*Assistant Examiner*—James R. Hall
*Attorney, Agent, or Firm*—Lloyd E. Hessenaur, Jr.

[57] ABSTRACT

An improvement in the process of forming plastic articles wherein such articles are forged from a compression formed briquette of resinous powder, such improvement comprising (1) compressing a resinous powder having lamellar crystalline nonspherulitic morphology into a substantially unoriented briquette having green strength, (2) removing the briquette from the compressing device and placing the briquette in a forging press wherein lubrication is provided between the contacting surfaces of the briquette and the forging press to permit plug flow, and (3) forging the briquette into a shaped article while maintaining the briquette at a temperature between the alpha-transition temperature and the melt temperature of the resinous powder.

5 Claims, No Drawings

PROCESS FOR FORMING PLASTIC ARTICLES

This application is a continuation-in-part of copending application, Ser. No. 704,261 (now abandoned), filed July 12, 1976 which is a continuation of Ser. No. 545,662, filed Jan. 30, 1975 (now abandoned) which in turn is a continuation-in-part of Ser. No. 347,172, filed Apr. 2, 1973 (now abandoned).

BACKGROUND

There is a need for a fast predominantly solid phase process for forming articles directly from powdered thermoplastic resin materials. Such powder formed parts can be made at a lesser expense than a comparable part made by either an injection molding technique or a conventional vacuum forming process. The reasons for the favorable economics of powder formed parts are elimination of a pelletizing step, absence of excess scrap, a reduced cooling cycle and a more efficient material utilization.

Further, a process having relatively short heat cycle times is especially desired when fabricating thermally unstable resinous powders, such as the crystalline vinylidene halide polymers.

More particularly, the present invention is directed to a specific powder-forming process whereby decomposition-free, substantially fused, flexible plastic articles are unexpectedly obtained by utilization of certain processing conditions while employing resinous powders of specified morphology, i.e., resinous powders having a "lamellar crystalline nonspherulitic" morphology. The use of such materials would not be obvious to the skilled worker as these materials are generally of relatively low-bulk density and are subsequently difficult to handle. Further, that such results were unexpected is illustrated by the comparative data set forth in Example III herein wherein resins employed in their more conventional nonlamellar crystalline morphology were incapable of being forged into clear, void-free, flexible articles. Still further, the capability of the present process to provide decomposition-free, substantially clear, flexbile articles was unexpected in view of the teaching of U.S. Pat. No. 3,502,639 which requires the use of annealed "oriented" crystalline structures wherein the lamellae are stacked parallel to one another. Such teaching clearly leads away from the present invention wherein substantially "unoriented" briquettes are forged into shaped articles.

SUMMARY OF THE INVENTION

It has been discovered, which discovery represents the present invention, that shaped articles of excellent clarity and uniformity can be prepared by a process comprising the sequential steps of (1) compressing a resinous powder having lamellar crystalline nonspherulitic morphology into a substantially unoriented briquette having green strength, (2) removing the briquette from the compressing device and placing the briquette in a forging press wherein lubrication is provided between the contacting surfaces of the briquette and the forging press to permit plug flow, and (3) forging the briquette into a shaped article while maintaining the briquette at a temperature between the alpha-transition temperature and the melt temperature of the resinous powder.

DESCRIPTION OF THE PREFERRED EMBODIMENTS

As set forth supra, it is required that the resin powders utilized in the process herein described have a lamellar crystalline nonspherulitic morphology. Such resins may be prepared, for example, by crystallization from dilute solution, as described by Bassett et al. in *Journal of Polymer Science,* Vol. 1, pp. 763–788 (1963), or by polymerization in solution as described by R. A. Wessling and I. R. Harrison in *Journal of Polymer Science,* A-1, 9, 347 (1971) and N. Toyota and S. Machi in *Journal of Polymer Science,* A-2, 7, 153 (1969). Exemplary of useful resins are those having a crystallinity (as measured by conventional X-ray diffraction methods) of from about 30 to 98 percent, including the crystalline polyolefins such as polyethylene and polypropylene, polyoxymethylene, isotactic polystyrene, nylons, the crystalline vinylidene halide polymers, and blends of such resins. The process is particularly useful for fabricating thermally unstable polymers, such as the crystalline vinylidene halide polymers, or extremely high molecular weight polymers that cannot be fabricated by conventional molding and extrusion techniques.

When using the forming process of the present invention a certain series of steps are employed. These steps are as follows:

An amount of powdered resin is compressed in a mold, generally at room temperature, into a substantially nonoriented briquette, while using a pressure sufficient to provide "green strength," i.e., strength to hold together in a given configuration at room temperature. Generally, a pressure up to about 30,000 psi at 25° C. is sufficient. However, any combination of pressure and temperature other than that resulting in cold flow of the resin powder may be used. The briquette is removed from the compressing device and placed in a forging press, maintained at a temperature from about the alpha-transition (Tα) to less than the melting point (Tm) or melt temperature of the polymer wherein lubrication is provided between the contacting surfaces of the briquette and the forging press to permit plug flow deformation whereby fusion of the resin powder particles occurs. An explanation of the "alpha-transition temperature" can be found in *Anelastic and Dielectric Effects in Polymeric Solids,* pages 141–143, by N. G. McCrum, B. E. Read and G. Williams; J. Wiley and Sons, N.Y., N.Y., published 1967. For crystalline polymers, the "alpha-transition temperature" is taken as an energy loss peak associated with the crystalline region often observed about 50° C. to 100° C. below the melting point of the polymer. Well known examples are Tα values of about 50° C. in polyethylene, and about 80° C. in crystalline vinylidene chloride polymers.

When heated above the alpha-transition temperatuare, crystalline polymers become increasingly ductile and finally start to melt. Melting in crystalline polymers occurs over a range of about 20° C. or more. The upper limit, at which the last traces of crystallinity disappears, is called the "melting point" as herein defined. In conventional prior art fabrication technology, the polymer is heated to about the melting point or above before forming. Like amorphous polymers, the crystalline polymers are a viscous fluid or liquid above the melting point. If the briquette described herein were heated uniformly to temperatures above the melting point, the process would be a conventional viscous flow type. By maintaining the temperature of the briquette below the melting point for the crystalline polymer, the particles therein are able to deform and fuse by a substantially plastic solid phase flow mechanism.

Also, according to the process of the present invention, the surfaces of the sintered briquette are lubricated, or the platens of a mold in which it is to be compressed are alternately lubricated and the briquette is then squeezed or forged under conditions that produce substantial plug flow into a preform, which can be disc shaped whereby fusion of the sintered powder particles occurs. To form effective fusion, the mold platens are warmed to a temperature from Tα to Tm. Alternatively, the briquette can be preheated to a temperature between Tα and Tm to somewhat soften and sinter said briquette before placing in the press. Preheating the briquette, while not essential, can be used advantageously to speed up the overall process by reducing the residence time in the press. The resulting preform, obtained by either method, can then be cooled for later thermoforming or can be directly transferred by a clamp ring to a thermoforming mold, while still warm, for forming into a desired shaped article by differential air pressure means, or by matched die forming, vacuum forming, plug assist vacuum forming, draw forming, impact forming, rubber pad forming, hydro-forming or the like. It is also possible to form, in a set of impact molds, directly in the forging step, a finished article such as a shallow can or lid.

By the use of lubrication on the mold or briquette surfaces, the deformation pattern during forging of the briquette into a preform is changed from one of a "parabolic flow" to one of stretching "plug flow." It has, thus, been found that in forging briquettes of thermoplastic powders, such as between flat anvils of a mold to form a disc, unsatisfactory results may be obtained unless an adequate lubricant is used between the surfaces of the mold and the surfaces of the briquette. Thus, lubrication between the mold and briquette surfaces is an important parameter in the forming of powders. As lubricants, greases such as potassium oleate, silicone grease, and oils or other substantially equivalent material can be wiped on the mold or briquette. Alternatively, solid particles, such as polytetrafluoroethylene or zinc stearate, can be sprayed onto the mold or a polytetrafluoroethylene coat can be baked onto the mold. All of these lubricants have been tried and worked to a degree, with the greases working especially well. The advantages of lubricating the mold for heat-sensitive resin materials are two-fold. One, it changes the deformation pattern so that less springback (warpage) is obtained in the formed piece. Secondly, it changes the pattern of heat build-up in the material giving a uniform temperature rise over the entire preform, rather than a concentrated temperature rise in a localized area, e.g., the center of the preform.

It is the essence of the present invention that utilization of resin powders having lamellar crystalline nonspherulitic morphology provides substantially nonoriented briquettes having green strength and ability to be formed, according to process described herein, to provide substantially fused, flexible, decomposition-free shaped objects, as compared to nontransparent, nonuniformly fused formed objects made from briquettes prepared from crystalline polymers of the same composition but having a nonlamellar crystalline or spherulitic morphology. The following examples, wherein all parts and percentages are by weight, are illustrative of such phenomena.

EXAMPLE I

Into a glass reactor containing a solution comprising 0.2 part of diisopropyl percarbonate in 80 parts of distilled dioxane prepurged with nitrogen was added 20 parts of distilled vinylidene chloride monomer. The mixture was allowed to react for a 40-hour period at a temperature of 20° C. with agitation by a paddle blade stirrer operating at 150 RPM. Following completion of the polymerization reaction, the resulting polymer was recovered by filtration, washed and dried. The resulting dry, free-flowing powder was of a lamellar crystalline nonspherulitic morphology. This powder was then compressed at 25° C. under 5000 pounds pressure into a smooth, virtually void-free briquette. The briquette, when placed in an impact-molding machine operating at 135° C. and lubricated with either potassium oleate or polytetrafluoroethylene powder, formed a clear, flexible sheet which was free from any evidence of polymer degradation. By way of comparison, utilization of the described process without lubrication produced a severely degraded sheet.

EXAMPLE II

Clear, flexible decomposition-free polymer sheets were prepared by the process of the present invention as described in Example I but wherein the powdered resin used was a copolymer of between about 92 and 99 mole percent of vinylidene chloride and between about 8 and 1 mole percent of methyl acrylate and wherein all of such polymers were characterized by having a lamellar crystalline nonspherulitic morphology.

EXAMPLE III

In each of a series of additional experiments, individual samples of polyethylene of varying molecular weight and of nonlamellar crystalline morphology were recrystallized in xylene to form powder of lamellar crystalline nonspherulitic morphology, and compressed into smooth, virtually void-free briquettes substantially as set forth in Example I. The following Table I sets forth the properties of such materials:

TABLE I

| | Sample Designation | | | |
|---|---|---|---|---|
| | A | | B | |
| | Original | Crystallized | Original | Crystallized |
| % Crystallinity (absolute) | 82 | 87 | — | — |
| Bulk Density (gms./50 cm.$^3$) | 24.1 | 2.6 | 17.7 | 3.4 |
| Disc Breaking Strength (lbs.) | 9 | 176 | 45 | 127 |
| Disc Density (% of maximum) | ≈72 | ≈95 | 80 | 97 |
| Melt Index | ≈0.002 | — | 0.3 | 0.3 |

Each of the briquettes, when placed in an impact-molding machine, for a period of about 1 second, said molding machine operating at a platen temperature of about 143° C. formed clear, void-free, flexible sheets. By way of comparison, clear, void-free, flexible sheets were unobtainable using the nonrecrystallized starting polyethylene as described herein.

EXAMPLE IV

20 Grams of a crystalline polypropylene powder having a bulk density of 24.5 gms./50 ml., were dissolved in 1500 ml. of xylene at a temperature of about 140° C. The solution was then permitted to cool slowly with agitation to a temperature of about 125° C. The agitation was then stopped and the solution was permitted to cool slowly to a temperature of about 25° C., after which the precipitate from such solution was filtered and washed with petroleum ether until the xylene was removed. The resultant powder was sifted while still damp, and then air dried.

This powder was found to be of lamellar crystalline nonspherulitic morphology. The powder was then impact formed, as described in Example III, to provide clear, void-free articles.

What is claimed is:

1. A process of forming decomposition-free, substantially fused, clear, flexible plastic shaped articles comprising the sequential steps of (1) compressing in a compressing device a resinous powder having lamellar crystalline nonspherulitic morphology into a substantially unoriented briquette having green strength, (2) removing said briquette from the compressing device and placing said briquette in a forging press wherein lubrication is provided between the contacting surfaces of the briquette and said forging press to effect plug flow, and (3) forging said briquette into a shaped article while maintaining said briquette at a temperature between the alpha-transition temperature and the melting point of said resinous powder.

2. The process of claim 1 wherein the briquette is heated to a temperature of from about the alpha-transition temperature to less than the melt temperature of said resinous powder, after being removed from said compressing device and prior to being placed in said forging press.

3. The process of claim 2 wherein said resinous powder is a crystalline vinylidene chloride polymer.

4. The process of claim 2 wherein said resinous powder is polyethylene.

5. The process of claim 2 wherein said resinous powder is polypropylene.

* * * * *